United States Patent
Erath et al.

[19]

[11] Patent Number: 6,151,277
[45] Date of Patent: Nov. 21, 2000

[54] HYDROPHONE WITH FERROELECTRIC SENSOR

[75] Inventors: Louis W. Erath, Abbeville, La.; Gary Craig, Houston, Tex.

[73] Assignee: Syntron, Inc., Houston, Tex.

[21] Appl. No.: 09/292,915

[22] Filed: Apr. 16, 1999

[51] Int. Cl.[7] .............................. G01V 1/38; G01V 1/16
[52] U.S. Cl. ..................... 367/173; 367/154; 367/165; 367/188; 310/337
[58] Field of Search ................................ 367/154, 165, 367/173, 188; 310/337

[56] References Cited

U.S. PATENT DOCUMENTS

| | | | |
|---|---|---|---|
| 5,589,725 | 12/1996 | Haertling | 310/358 |
| 5,600,608 | 2/1997 | Weiss et al. | 367/20 |
| 5,632,841 | 5/1997 | Hellbaum et al. | 156/245 |
| 5,639,850 | 6/1997 | Bryant | 528/353 |
| 5,781,510 | 7/1998 | Chang et al. | 367/188 |
| 5,796,676 | 8/1998 | Chang et al. | 367/154 |
| 5,849,125 | 12/1998 | Clark | 310/330 |
| 5,867,451 | 2/1999 | Chang et al. | 367/165 |

*Primary Examiner*—Ian J. Lobo
*Attorney, Agent, or Firm*—Felsman, Bradley, Vaden, Gunter & Dillon, LLP

[57] ABSTRACT

An arcuate or flat ferroelectric sensor is incorporated in a seismic streamer. The structure comprises two half-cylinders which are mounted together around a cable. The half-cylinders are coupled together by bolts or pins or any other appropriate means. Each half-cylinder defines a well into which a sensor is mounted. With the sensor in place, the structure is covered over with a sound-transparent material to receive an acoustic signal into the sensor. Electrical leads from the sensor are directed through ports in the half-cylinders, and the leads are connected together to provide a composite sensed signal to the cable in analog form. The sensor in each half-cylinder is a single element hydrophone that, when connected to a sensor in a complementary half cylinder in series or in parallel, forms an acceleration cancelling hydrophone.

20 Claims, 4 Drawing Sheets

HYDROPHONE WITH FERROELECTRIC SENSOR

FIELD OF THE INVENTION

The present invention relates generally to the field of seismic streamers which are towed through water behind vessels for seismic exploration and, more particularly, to the field of hydrophone sensors for such a streamer.

BACKGROUND OF THE INVENTION

In modern marine seismic streamer systems, a vessel tows a long cable with a large number of sensors. Recent developments in such systems have simultaneously focused on making them light, durable, easy to manufacture and maintain, as well as sensitive to the acoustic signals of interest while remaining relatively immune to noise. These developments have lead to improvements in sensor elements, such as those disclosed in U.S. Pat. Nos. 5,541,894; 5,663,931; 5,677,894; and others, which have been increasingly durable and which eliminate the long vexing problem of distortion due to harmonics.

Another improvement in sensor technology was disclosed in U.S. Pat. No. 5,632,841 to Hellbaum et al. which teaches a method for forming ferroelectric wafers including a pre-stress layer. This method results in an arcuate sensor which is particularly sensitive to an acoustic signal.

However, there remains a need for a structure which incorporates this improved sensor in a manufacturable marine seismic streamer. Such a structure may use the arcuate sensor element of Hellbaum et al., or it may use more conventional flat or domed diaphragm elements with a conventional flat piezoelectric sensor.

SUMMARY OF THE INVENTION

The present invention addresses this need in the art by providing a structure in which an arcuate or a flat ferroelectric sensor is incorporated in a seismic streamer. The structure comprises two half-cylinders which are mounted together around a cable. The half-cylinders are coupled together by bolts or pins or any other appropriate means.

Each half-cylinder defines a well into which a sensor is mounted. With the sensor in place, the structure is covered over with a sound-transparent material to receive an acoustic signal into the sensor. Electrical leads from the sensor are directed through ports in the half-cylinders, and the leads are connected together to provide a composite sensed signal to the cable in analog form.

If an arcuate sensor element is used, each sensor is preferably formed in layers comprising beryllium copper, PZT crystal, and an aluminum backing, all sandwiched and sealed together with layers of a silicon adhesive polyamide. Beryllium copper tabs are formed and bent over to form a square shaped cup. The cup is placed into a well in the support structure, and preferably supported underneath by a compliant rubber or other material.

If a conventional flat sensor element is used, the sensor element may be mounted on a dome-shaped diaphragm or a flat diaphragm. This structure may also include a depth-limiting device which is useful in certain applications, and the depth-limiting device may preferably comprise a set screw which is adjusted under pressure and then sealed or locked in place.

These and other features of the present invention will be apparent to those skilled in the art from a review of the following detailed description.

DETAILED DESCRIPTION OF A PREFERRED EMBODIMENT

Figure 1:
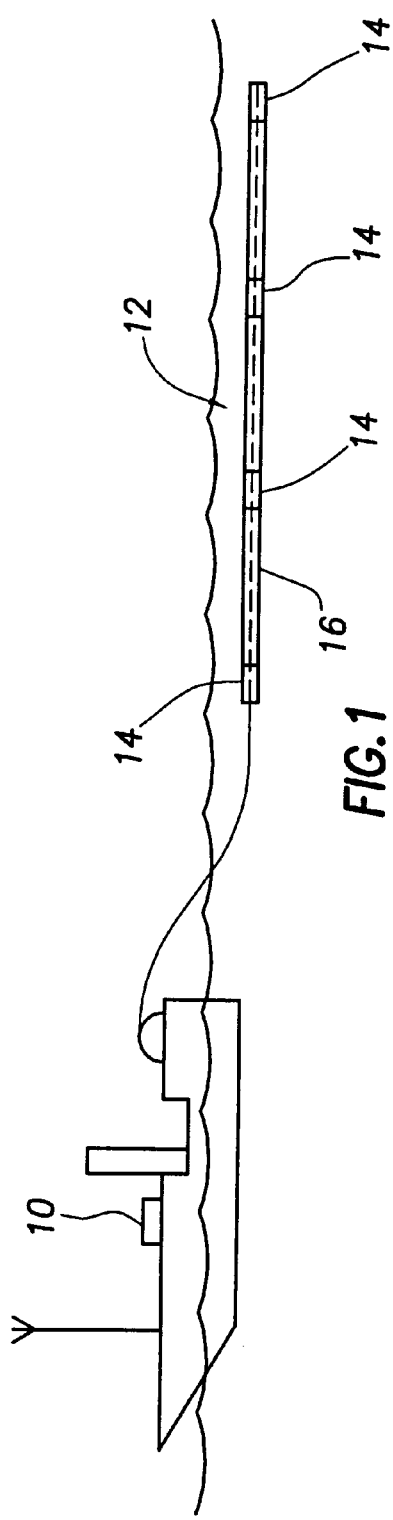
FIG. 1 is an overall schematic of a marine seismic system.

FIG. 1 depicts a schematic of a basic marine system including a vessel 10 towing a streamer 12. The streamer has a number of pieces of auxiliary equipments, such as depth control devices, associated with it that are not shown for simplicity.

The streamer 12 also includes a number of sensor components 14 spaced apart along the streamer. The sensor components and buoyant material are sealed with a jacket 16, preferably made of polyurethane, to present a smooth profile to minimize flow noise. It is in the sensor components 14 wherein the present invention resides.

Figure 2:
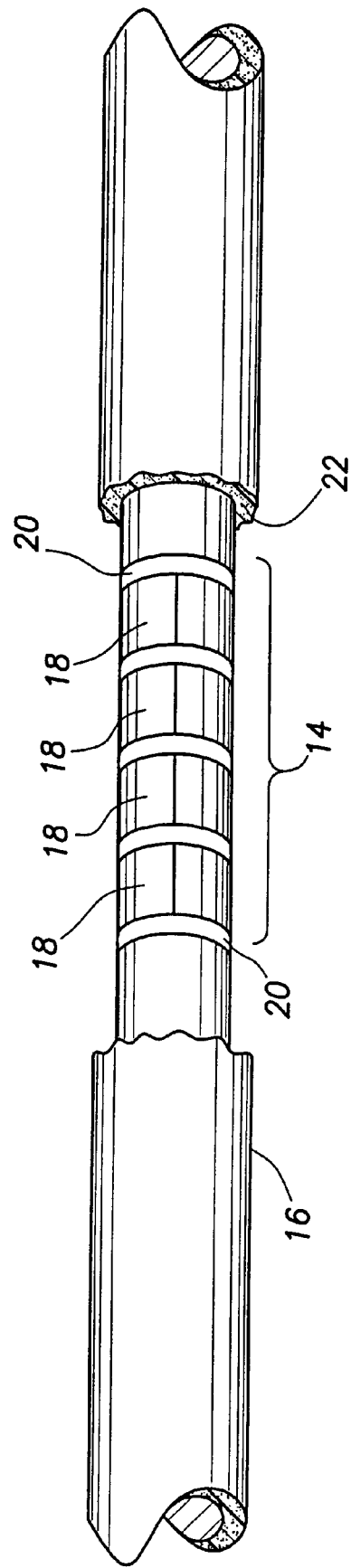
FIG. 2 is a partial cutaway view of a streamer cable.
Figure 3:
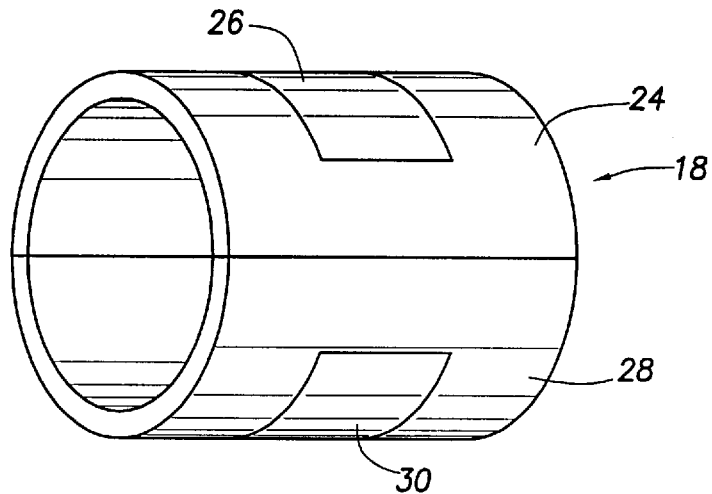
FIG. 3 is a perspective view of the sensor structure and its support.

FIG. 2 present a detail view of a sensor component 14 in a segment of the streamer 12. A sensor component is made up of several sensor segments 18, of which four such segments are shown in FIG. 2. Each of the segments is separated from a neighboring segment by a plastic ring 20, which may preferably be made of sorbathane. The segments 18 and the rings 20 are covered by a foam 22, which in turn is covered by the jacket 16.

A sensor segment 18 is shown in more detail in FIGS. 3, 4a, 4b, and 4c. A segment 18 is primarily made up of an upper cylindrical half 24 which retains a sensor element 26 and a lower cylindrical half 28 which retains a sensor element 30. The sensor elements 26 and 30 are formed as described in U.S. Pat. No. 5,632,841 and are available from FACE International Corporation, Norfolk, Va., under the trade name THUNDER. Each such element comprises a five-layer formation of 0.001" aluminum, 0.0005" silicon polyamide adhesive, 0.01" piezoelectric crystal such as lead zirconium titanate, 0.0005" silicon polyamide adhesive, and 0.015" beryllium copper.

Figure 4C:
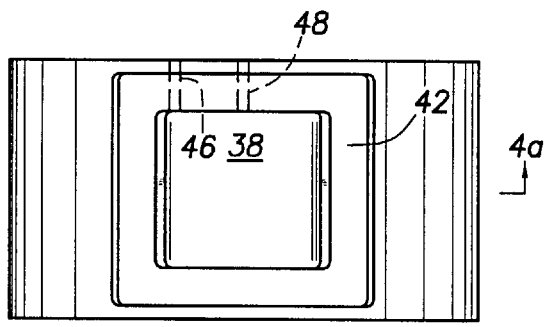
FIGS. 4a, 4b, and 4c are end, top, and side views of the sensor structure and its support.
Figure 4B:
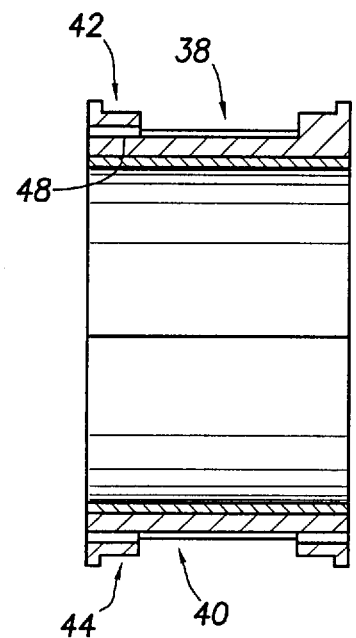
Figure 4A:
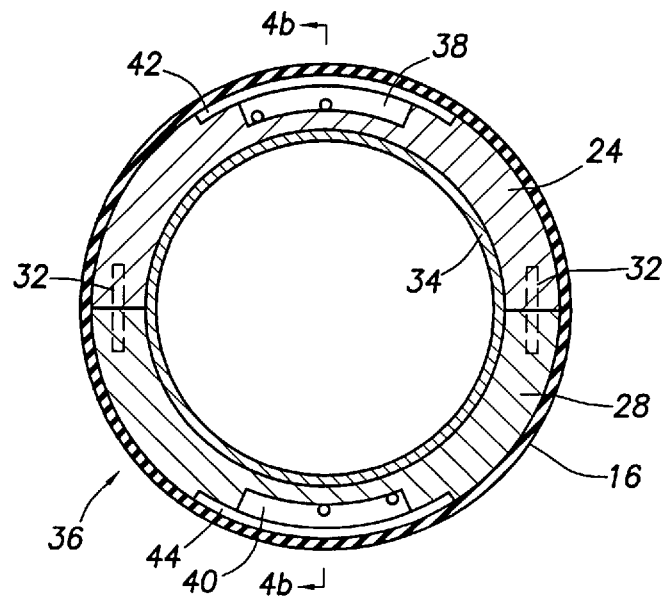

Further details of a sensor segment are shown in FIGS. 4a, 4b, and 4c. FIG. 4a is a section view a sensor segment. The sensor segment is shown without the sensor element for clarity. The segment comprises the upper cylindrical half 24 and the lower cylindrical half 28, held together with appropriate means, such as pins 32, or preferably bolts. The upper and lower cylindrical halves fit snugly against a layer 34 of a compliant material for noise isolation, and are covered with the jacket 16.

The upper and lower cylindrical halves together form a sensor carrier 36 and are preferably machined from titanium. Machined into the carrier 36 is a top sensor well 38 and a bottom sensor well 40, which retain the sensors. A top shallow depression 42 and a bottom shallow depression 44 provide a volume for the placement of a sealing material, such as neoprene rubber, to retain the sensors and provide a smooth contour. The wells 38 and 40 and the depressions 42 and 44 are shown in profile in FIG. 4b. Also machined through the halves 24 and 28 are a pair of sensor lead ports 46 and 48. In assembling the sensor assembly, the sensor lead are fed through the lead ports and coupled to other sensors in a group to form a group of hydrophones.

Figure 5:
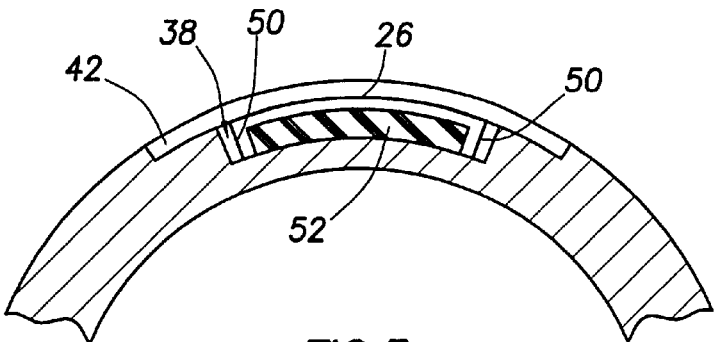
FIG. 5 is an enlarged end section view showing detail of the sensor support.

FIG. 5 shows additional details of the mounting of the sensor 26 within the well 38. In one aspect of the present invention, the pre-formed arcuate sensor 26 fits into the well 38. As previously described, the sensor comprises a plurality of layers, one of which is beryllium copper. The beryllium copper layer of the sensor is extended beyond the other layers to form a set of tabs 50, which are bent over toward the other layers. Beneath the sensor may be formed a void, but preferably a compliant rubber pedestal 52 is formed to provide a backing for the sensor 26. The pedestal 52 may also be of a metal, or even machined in place on the support.

Figure 6A:
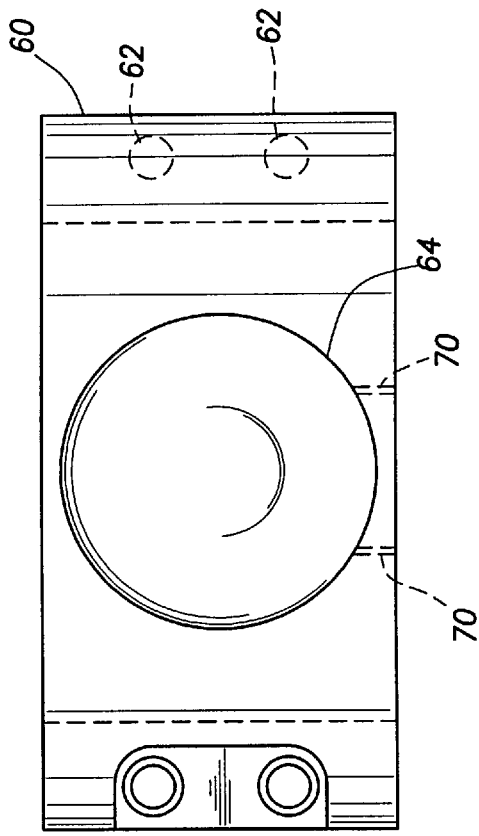
FIGS. 6a, 6b, and 6c are top, side, and end view of another preferred embodiment of the sensor structure and its support.
Figure 6B:
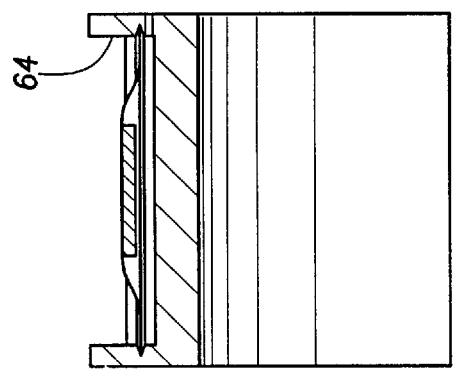
Figure 6C:
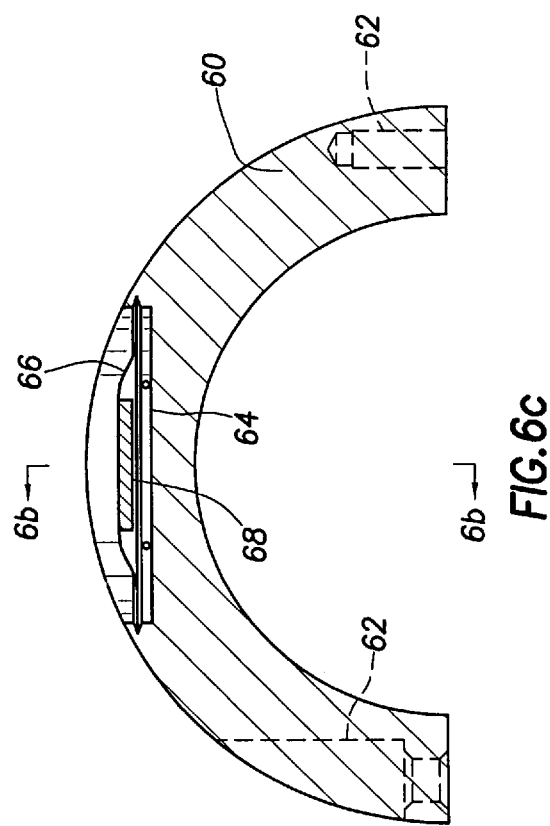

FIGS. 6a, 6b, and 6c depict another preferred embodiment of this invention, in which a conventional flat piezoelectric element is used. The support structure comprises an upper cylindrical half 60 which bolts to a lower cylindrical half (not shown) as with bolts 62. This structure defines a cylindrical well 64 to receive a diaphragm 66 on which is mounted a flat piezoelectric element 68. The diaphragm as shown in FIG. 6c may be substantially dome-shaped, with a flat top portion to receive the flat piezoelectric element. The diaphragm and piezoelectric element are then secured onto the support structure with a sound-transparent plastic, and the leads from the sensor run through holes 70 to the cable.

Figure 7:
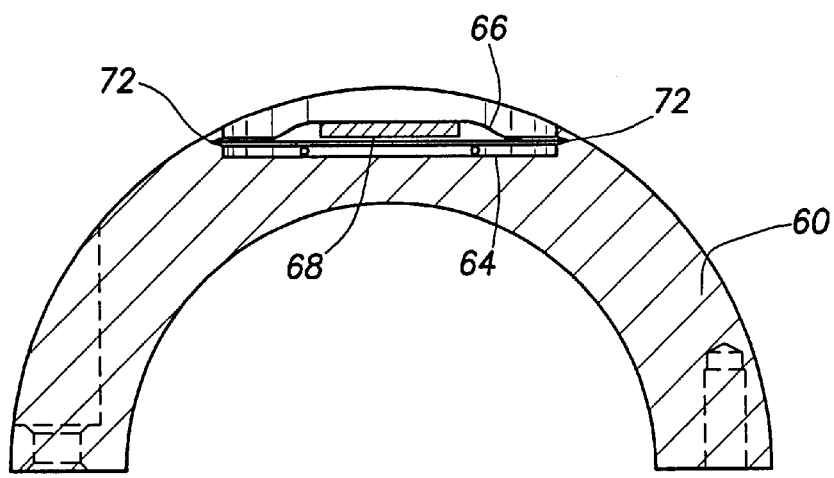
FIG. 7 is an enlarged end section view showing detail of the sensor support using a domed-shaped diaphragm.
Figure 8:
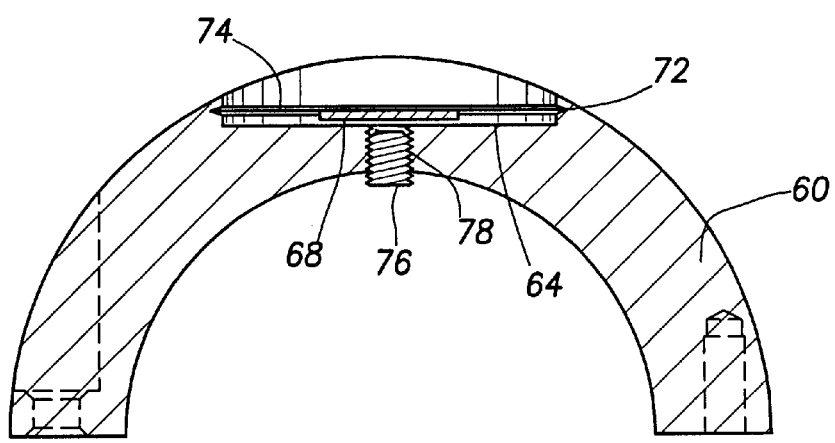
FIG. 8 is an enlarged end section view showing detail of the sensor support using a flat diaphragm and further including a depth-limiting device.

FIG. 7 depicts a variation of the embodiment of FIGS. 6a, 6b, and 6c. The upper cylindrical half 60 includes a circular well 64, and a detent 72 is formed in the wall of the well 64 to receive the dome-shaped diaphragm 66. Rather than a detent, other equivalent structures may be used, such as a counter sunk shelf, on which the diaphragm is then potted, and other structures. FIG. 8 depicts an upper cylindrical half 60 with cylindrical well 64, which in this case supports a flat diaphragm 74 on which is mounted the piezoelectric element 68. The embodiment of FIG. 8 further includes another feature of this invention, a set screw 76 which screws into a threaded hole 78. This feature limits the depth at which the hydrophone functions, since at depth the diaphragm 66 or 74 will be forced down upon the set screw and will therefore no longer flex in response to an acoustic signal. The set screw is preferably adjusted while the structure is subjected to pressure, then secured in place as with potting material, locktite, or the like.

The present invention provides a number of advantages to hydrophone sensor structures previous in use in the art. For example, the assembly is easy to assemble into a complete marine seismic streamer and, if a sensor element should fail, is particularly suited to removal of the failed element and a replacement installed in its place. It presents a very rugged package with a smooth profile to minimize flow noise.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A hydrophone on a seismic cable defining an axis, the hydrophone comprising:
   a. an upper support comprising a half-cylinder and having an upper well formed therein, the well defining two pairs of mutually opposed walls, a bottom, and an opening extending radially outwardly from the axis;
   b. a lower support comprising a half-cylinder and having a lower well formed therein and coupled to the upper support, the well defining two pairs of mutually opposed walls, a bottom, and an opening extending radially outwardly from the axis;
   c. an upper piezoelectric sensor in the upper well;
   d. a lower piezoelectric sensor in the lower well; and
   e. leads from the piezoelectric sensors through the respective supports to the cable.

2. The hydrophone of claim 1, wherein each sensor comprises an arcuate sensor having a plurality of layers.

3. The hydrophone of claim 2, wherein the layers comprise a piezoelectric crystal sandwiched between beryllium copper and aluminum and held together with a silicon polyamide adhesive.

4. The hydrophone of claim 3, further comprising tabs extending from each sensor extending radially inwardly toward the axis.

5. The hydrophone of claim 4, further comprising a pedestal between each sensor and its respective support.

6. The hydrophone of claim 1, wherein each well is an open-topped cylinder and each respective sensor is mounted on the underside of a diaphragm.

7. The hydrophone of claim 6, wherein the diaphragm is dome-shaped.

8. The hydrophone of claim 1, wherein each support comprises a half-cylinder configured to mount to a marine seismic streamer cable.

9. The hydrophone of claim 8, further comprising a sound absorptive layer between each support and the cable.

10. The hydrophone of claim 1, further comprising a shallow depression around each well to receive a sealant to seal the sensor to the support.

11. A sensor component in a marine seismic streamer on a towed cable defining an axis, the component comprising a plurality of sensor segments in spaced apart relation on the cable, each of the segments comprising:
   a. an upper half cylinder and a lower half cylinder joined together around the cable, each of the cylinders having a well formed therein, each well defining two pairs of mutually opposed walls, a bottom, and an opening extending radially outwardly from the axis; and
   b. an arcuate piezoelectric sensor in each of the wells.

12. The component of claim 11, wherein each of the sensors comprises a plurality of layers comprising a piezoelectric crystal sandwiched between beryllium copper and aluminum and held together with a silicon polyamide adhesive.

13. The component of claim 12, further comprising tabs extending from and bent at an angle to each of the sensors and extending radially inwardly toward the axis.

14. The component of claim 13, further comprising a pedestal between each sensor and its respective cylinder.

15. The component of claim 11, further comprising:
   a. electrical leads from each sensor; and
   b. a pair of holes through each half cylinder to house the leads.

16. The component of claim 11, further comprising a sound absorptive layer between the half cylinders and the cable.

17. The hydrophone of claim 11, further comprising a shallow depression around each well to receive a sealant to seal a respective of the sensors to its respective half cylinder.

18. A method of making a hydrophone comprising the steps of:
   a. forming a pair of half cylinders configured to fit around a marine seismic streamer cable, the cable defining an axis;
   b. forming a well in each of the pair of half cylinders, each well defining two pairs of mutually opposed walls, a bottom, and an opening extending radially outwardly from the axis; and
   c. mounting a piezoelectric sensor in each well.

19. The method of claim 18, wherein the sensor comprises an a layered arcuate piezoelectric element.

20. The hydrophone of claim 1, further comprising a set screw through the support to contact the sensor at a predetermined pressure.

* * * * *